(12) United States Patent
K A et al.

(10) Patent No.: US 9,755,962 B2
(45) Date of Patent: Sep. 5, 2017

(54) REDUCING LINK STATE PROTOCOL TRAFFIC DURING GRACEFUL RESTART

(71) Applicant: Juniper Networks, Inc., Sunnyvale, CA (US)

(72) Inventors: Salih K A, Thodupuzha (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 196 days.

(21) Appl. No.: 14/700,025

(22) Filed: Apr. 29, 2015

(65) Prior Publication Data
US 2016/0269293 A1    Sep. 15, 2016

(30) Foreign Application Priority Data

Mar. 11, 2015 (IN) .......................... 1186/CHE/2015

(51) Int. Cl.
*H04L 12/721* (2013.01)
*H04L 12/751* (2013.01)
*H04L 12/801* (2013.01)

(52) U.S. Cl.
CPC .............. *H04L 45/32* (2013.01); *H04L 45/02* (2013.01); *H04L 45/026* (2013.01); *H04L 45/26* (2013.01); *H04L 47/10* (2013.01)

(58) Field of Classification Search
None
See application file for complete search history.

(56) References Cited

U.S. PATENT DOCUMENTS

| 7,334,047 | B1 * | 2/2008 | Pillay-Esnault | ........ | H04L 45/02 709/239 |
| 2014/0173133 | A1 | 6/2014 | Ammireddy | | |
| 2014/0269407 | A1 | 9/2014 | Anand et al. | | |

OTHER PUBLICATIONS

Extended Search Report from counterpart European Application No. 16159694.5, dated Jul. 13, 2016, 9 pp.
Moy, "Extending OSPF to Support Demand Circuits," Network Working Group, RFC 1793, Apr. 1995, 32 pp.
Moy, "OSPF Version 2," Network Working Group, RFC 2328, Apr. 1998, 244 pp.
Moy, "Graceful OSPF Restart," Network Working Group, RFC 3623, Nov. 2003, 18 pp.

(Continued)

*Primary Examiner* — Edan Orgad
*Assistant Examiner* — Saumit Shah
(74) *Attorney, Agent, or Firm* — Shumaker & Sieffert, P.A.

(57) ABSTRACT

A routing device coupled to a remote routing device via a link on which a flood reduction technique is used, such as a demand circuit, is configured to store an indication of a link state of the remote routing device and a first sequence number associated with the link state, receive an indication that the remote routing device is performing a graceful restart, and then receive data indicative of a new link state of the remote routing device and a second sequence number. The routing device determines whether the new link state is different than the stored indication of the link state, and if not, avoids requesting the current link state from the remote routing device. In this manner, the routing device may reduce link-state protocol traffic within an autonomous system including the routing device and the remote routing device.

33 Claims, 4 Drawing Sheets

(56) References Cited

OTHER PUBLICATIONS

Rao et al., "Detecting Inactive Neighbors over OSPF Demand Circuits (DC)," Network Working Group, RFC 3883, Oct. 2004, 6 pp.
Pillay-Esnault, "OSPF Refresh and Flooding Reduction in Stable Topologies," Network Working Group, RFC 4136, Jul. 2005, 5 pp.
Response to Communication pursuant to Rule 69 EP dated Sep. 19, 2016, from counterpart European Application No. 16159694.5, filed on Mar. 14, 2017, 15 pp.

* cited by examiner

REDUCING LINK STATE PROTOCOL TRAFFIC DURING GRACEFUL RESTART

This application claims the benefit of India Patent Application No. 1186/CHE/2015, filed Mar. 11, 2015, the entire content of which is incorporated herein by reference

TECHNICAL FIELD

This disclosure relates to computer networks and, more particularly, to routing protocols used within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols use flooding-based distribution mechanisms to announce topology information to routers within the network. These routing protocols typically rely on routing algorithms that require each of the routers to have synchronized routing topology information. For example, Open Shortest Path First (OSPF) and Intermediate system to intermediate system (IS-IS) routing protocols are link state protocols that use link state messages to ensure their routing topology is synchronized with respect to available interfaces, metrics and other variables associated with network links. For example, OSPF utilizes Link State Advertisements (LSAs) while IS-IS uses Link State protocol data units (LSPs) to exchange information.

A router generating a link state message typically floods the link state message throughout the network such that every other router receives the link state message. In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages.

In some cases, routers are configured to periodically broadcast link state messages to other routers within a network such that all routers in the network maintain synchronized link state databases (representative of topology information). As the network grows larger, these link state messages can become burdensome for the routers in the network. Efforts have been made to reduce the impact of such link state messages for the purpose of refreshing the databases of the routers, for example, by reducing the number of link state messages that are sent.

SUMMARY

In general, this disclosure describes techniques for reducing link state protocol traffic during link state exchange between routers during graceful restart. That is, this disclosure describes protocol operations that may be performed during graceful restart in an environment with reduced link state messages. In some examples, the techniques include determining, with a router that has received a description of link state in association with a sequence number, whether the description indicates the link state is modified with respect to previously-received link state stored by the router but associated with a different sequence number. The techniques may be particularly applicable after a graceful restart of a router. Previous efforts to reduce link state protocol traffic have included demand circuits and flood reduction. However, in cases where a first router is connected to a second router by way of a demand circuit and a third router without a demand circuit, the first router must periodically send link state advertisements (LSAs) to the third router, each time incrementing a sequence number associated with a link state of the first router. This means that, even when the link state for the first router has not changed, the second router and the third router will have different sequence numbers for the link state of the first router (because the first router does not send the LSAs to the second router, due to the demand circuit, when sending the LSAs to the third router).

Different sequence numbers associated with a link state in respective link state databases of the second and third routers would not typically be an issue. In some cases, however, the first router may also perform a graceful restart and, after restarting, send database description (DBD) packets to the second and third routers. These DBD packets include the most recent sequence number for the link state of the first router. Thus, the second router would ordinarily determine that the stored link state is out of date. Accordingly, the second router would request the LSA from the first router, which is unnecessary assuming that the link state has not in fact changed. Thus, this disclosure describes techniques for determining whether such a request is necessary, i.e., in a situation where sequence numbers for a link state of the first router are different between a link state as stored by the second router and as advertised in a DBD packet by the first router during graceful restart. When the sequence numbers are different but the link states are otherwise determined to be the same, the second router avoids requesting an LSA from the first router, in accordance with the techniques of this disclosure, which may reduce link state protocol traffic following graceful restart.

In one example, a method includes receiving, by a first routing device that is communicatively coupled to a second routing device via a link on which a flood reduction technique is used, such as a demand circuit, a first set of data from the second routing device indicative of a first link state for the second routing device according to an interior gateway protocol (link-state protocol), wherein the first set of data is associated with a first sequence number and storing, by the first routing device, data representative of the first link state and the first sequence number. The method further includes, after receiving the first set of data, receiving, by the first routing device, a second set of data from the second routing device indicating that the second routing device will be performing a graceful restart, and after receiving the second set of data, receiving, by the first routing device, a third set of data from the second routing device representative of a second link state for the second routing device, wherein the third set of data is associated with a second sequence number that is different than the first sequence number. Furthermore, the method includes, in response to the second set of data and the third set of data, determining, by the first routing device, whether the second link state is different than the first link state despite the difference between the first sequence number and the second sequence number, and avoiding, by the first routing device, sending a request for a current link state to the second routing device when the second link state is determined to be the same as the first link state despite the difference between the first sequence number and the second sequence number.

In another example, a routing device includes a network interface communicatively coupled to a remote routing device via a link on which a flood reduction technique is used, such as a demand circuit. The routing device also includes one or more hardware-based processors configured to receive, via the network interface, a first set of data from the remote routing device indicative of a first link state for the remote routing device according to an interior gateway protocol (link-state protocol), wherein the first set of data is associated with a first sequence number and store data representative of the first link state and the first sequence number. The one or more hardware-based processors are also configured to, after receiving the first set of data, receive, via the network interface, a second set of data from the remote routing device indicating that the remote routing device will be performing a graceful restart, and after receiving the second set of data, receive, via the network interface, a third set of data from the remote routing device representative of a second link state for the remote routing device, wherein the third set of data is associated with a second sequence number that is different than the first sequence number. The one or more processors are further configured to, in response to the second set of data and the third set of data, determine whether the second link state is different than the first link state despite the difference between the first sequence number and the second sequence number, and avoid sending a request for a current link state to the remote routing device when the second link state is determined to be the same as the first link state despite the difference between the first sequence number and the second sequence number.

In another example, a system includes a first routing device and a second routing device communicatively coupled to the first routing device via a link on which a flood reduction technique is used, such as a demand circuit. The second routing device is configured to send a first set of data to the first routing device indicative of a first link state for the second routing device according to an interior gateway protocol (link-state protocol), wherein the first set of data is associated with a first sequence number, send a second set of data to the first routing device indicating that the second routing device will be performing a graceful restart, and after performing the graceful restart, to send a third set of data to the first routing device representative of a second link state for the second routing device following the graceful restart, wherein the third set of data is associated with a second sequence number that is different than the first sequence number. The first routing device is configured to store the first set of data and, in response to receiving the second set of data and the third set of data, determine whether the second link state is different than the first link state despite the difference between the first sequence number and the second sequence number, and avoid sending a request for a current link state to the second routing device when the second link state is determined to be the same as the first link state despite the difference between the first sequence number and the second sequence number.

In another example, a computer-readable medium, such as a computer-readable storage medium, contains, e.g., is encoded with, instructions that cause a processor of a routing device, communicatively coupled to a remote routing device via a link on which a flood reduction technique is used, such as a demand circuit, to receive a first set of data from the remote routing device indicative of a first link state for the remote routing device according to an interior gateway protocol (link-state protocol), wherein the first set of data is associated with a first sequence number, store data representative of the first link state and the first sequence number, after receiving the first set of data, receive a second set of data from the remote routing device indicating that the remote routing device will be performing a graceful restart, after receiving the second set of data, receive a third set of data from the remote routing device representative of a second link state for the remote routing device, wherein the third set of data is associated with a second sequence number that is different than the first sequence number, in response to the second set of data and the third set of data, determine whether the second link state is different than the first link state despite the difference between the first sequence number and the second sequence number, and avoid sending a request for a current link state to the remote routing device when the second link state is determined to be the same as the first link state despite the difference between the first sequence number and the second sequence number.

The details of one or more examples are set forth in the accompanying drawings and the description below. Other features, objects, and advantages will be apparent from the description and drawings, and from the claims.

DETAILED DESCRIPTION

Figure 1:
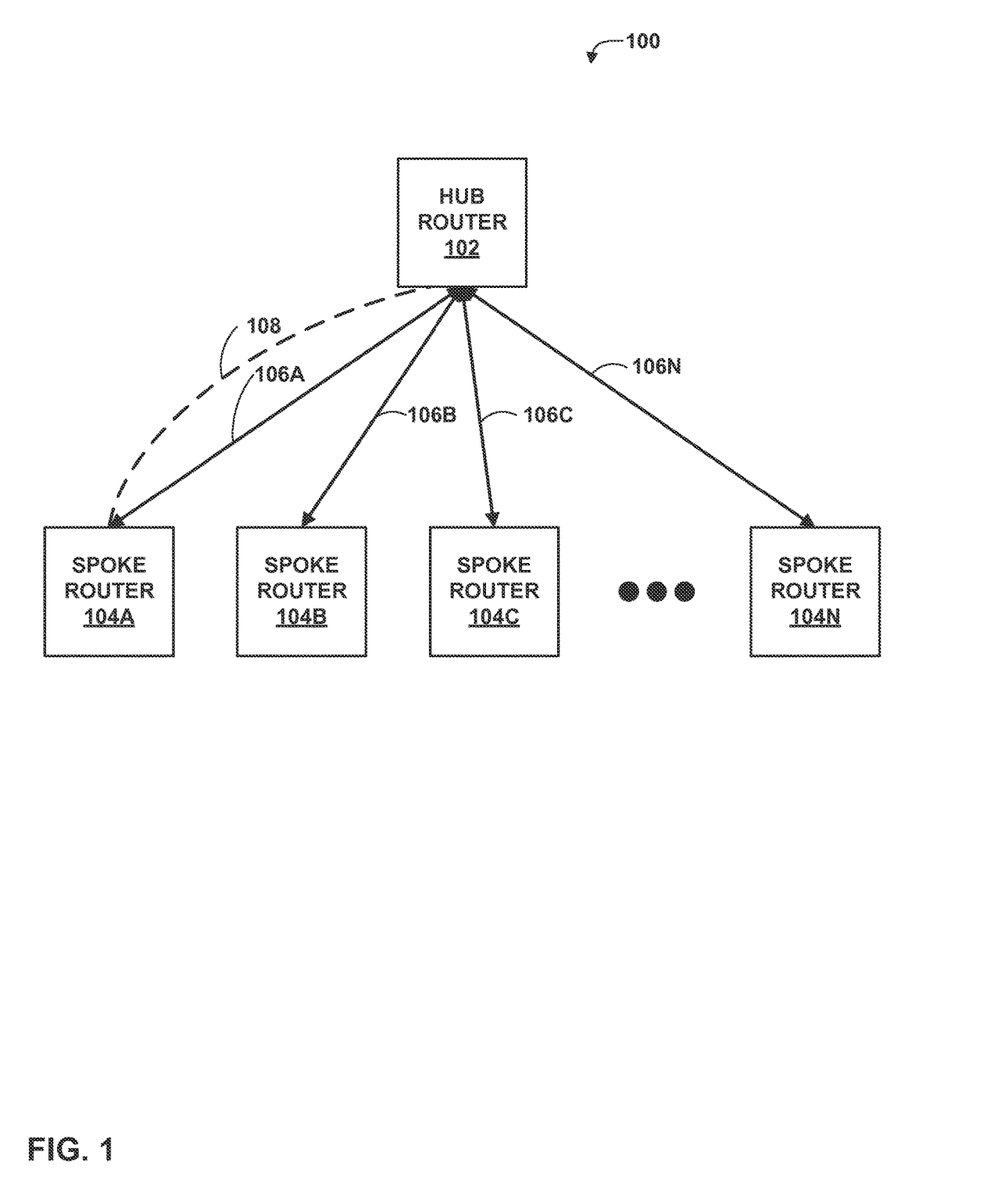
FIG. 1 is a block diagram illustrating an example hub-and-spoke arrangement, including a hub router and a plurality of spoke routers.

FIG. 1 is a block diagram illustrating an example hub-and-spoke arrangement 100, including hub router 102 and spoke routers 104A-104N (spoke routers 104). Hub-and-spoke arrangement 100 may correspond to a network (that is, a computer network) or form part of a network, such as an autonomous system or part of an autonomous system. More particularly, hub router 102 and spoke routers 104 exchange link state advertisements (LSAs) via respective links 106A-106N (links 106) according to a link-state protocol, such as Open Shortest Path First (OSPF). For purposes of explanation, this disclosure describes the example of OSPF, but it should be understood that other interior gateway protocols may also be used.

OSPF requires every LSA to be refreshed regularly according to an LSARefreshInterval (e.g., every 1800 seconds). Otherwise, the LSAs will expire when they reach a particular timeout period, e.g., 3600 seconds. That is, when a router, such as one of hub router 102 or spoke routers 104, does not receive a refreshed LSA from another one of the routers within the timeout period, the router determines that the link to the other router is down. Periodic LSA refreshes can result in a significant processing overhead for the routers in a large network. Pillay-Esnault, "OSPF Refresh and Flooding Reduction in Stable Topologies," Network Working Group, RFC 4136, July 2005, available at tools.ietf.org/html/rfc4136, describes an extension to the OSPF protocol to reduce the periodic flooding of Link State Advertisements (LSAs) in stable topologies.

In the example of FIG. 1, link 106A between hub router 102 and spoke router 104A represents an OSPF demand circuit 108, or other link on which a flood reduction technique is used. OSPF demand circuits are described in Moy, "Extending OSPF to Support Demand Circuits," Network Working Group, RFC 1793, April 1995, available at tools.ietf.org/html/rfc1793, and Rao et al., "Detecting Inactive Neighbors over OSPF Demand Circuits (DC)," Network Working Group, RFC 3883, October 2004, available at tools.ietf.org/html/rfc3883. RFC 1793 introduced demand circuit extensions to OSPF. Demand circuits are network segments whose costs vary with use; charges can be based both on connect time and on bytes/packets transmitted. The techniques of RFC 1793 and RFC 4136 make use the use of DoNotAge (DNA) LSAs to overcome the LSA expiration. This helps facilitate OSPF scaling by reducing traffic.

In this manner, because OSPF demand circuit 108 is established between hub router 102 and spoke router 104A, hub router 102 and spoke router 104A do not exchange LSAs at regular intervals. In other examples, other techniques for flood reduction may be employed instead of (or in addition to) a demand circuit. Instead, hub router 102 and spoke router 104A may exchange LSAs with a DNA bit set in the LSAs, which indicates that the LSAs are not to expire. That is, LSAs with link state age fields having the DNA bit set are not aged while they are held in the link state database of a router. This means they do not have to be refreshed on every LSARefreshInterval, as is otherwise done with other OSPF LSAs. However, OSPF mandates a router should never have the DNA bit set on the self-originated LSAs in its own database. It is required to send the LSAs every refresh interval on non-demand circuits or on interfaces which are not configured for flood reduction. Accordingly, hub router 102 will still periodically refresh LSAs sent to spoke routers 104B-104N, because links 106B-106N represent conventional, non-demand-circuit connections.

Deployments of OSPF demand circuit and/or flood reduction features are directed to multipoint hub-and-spoke arrangements, such as hub-and-spoke arrangement 100 of FIG. 1. This network type is useful in forcing traffic from multiple sites to traverse a central location (also referred to as a headquarters or "HQ"), represented by hub router 102 in FIG. 1. The point-to-multi-point network type may be used to overcome limitations at layer 2 of the OSI model. The network is described as a collection of point-to-point links where each router advertises a stub network with a /32 mask. By doing this, the spokes can maintain connectivity between each other when sourcing traffic from the interface connected to their common network.

To detect corruptions in the DNA bit in the age field (since age field is not included in the LSA checksum field), the originating router is required to refresh the LSAs periodically. This means on every refresh interval the sequence number associated with the LSAs get incremented on the originating router. Accordingly, when hub router 102 sends a refresh LSA to spoke routers 104B-104N, the sequence number of the LSA differs from the sequence number for the LSA stored in a database of spoke router 104A. Nevertheless, assuming hub router 102 has been operating normally and the network topology has remained stable, the content of the LSA for hub router 102 in the databases of spoke router 104A will be the same as the LSA for hub router 102 in the databases of spoke routers 104B-104N, despite a difference between sequence numbers. Likewise, link state ages need not be considered when determining whether the LSAs are the same or different when flood reduction techniques are employed, such as the use of demand circuits.

Functionality attributed to hub router 102 and spoke routers 104 is divided into conceptual planes, such as a forwarding plane and a control plane. The control plane is generally responsible for performing routing operations, such as executing routing protocols (e.g., OSPF) to discover routes through a network, programming the forwarding plane based on discovered routes, and communicating routing information with other routers. The forwarding plane is generally responsible for forwarding received packets.

In the example of FIG. 1, hub router 102 is also configured to perform graceful restart (GRES), e.g., in accordance with Moy, "Graceful OSPF Restart," Network Working Group, RFC 3623, November 2003, available at tools.ietf.org/html/rfc3623. RFC3623 describes Graceful Restart support for OSPF. It proposed an enhancement to the OSPF routing protocol whereby an OSPF router, such as hub router 102, can stay on the forwarding path even as its OSPF software is restarted, if the network topology remains stable. That is, when hub router 102 performs a graceful restart, elements operating in the control plane may be taken down while elements of the forwarding plane stay active and continue to forward packets. During the grace period, the neighbors continue to announce the restarting router in their LSAs as if it were fully adjacent (if the network topology remains static during the grace interval). Thus, when any of spoke routers 104 transmit LSAs while hub router 102 is performing a graceful restart, the LSAs generally indicate that hub router 102 is still active, even while the control plane of hub router 102 is offline due to the graceful restart.

In stable topologies, or where topology remains static during GRES (otherwise GRES will get aborted), only the restarting router needs to re-learn the LSAs with the help of its neighbors (which are acting as helpers, per the RFC, as soon as they receive the grace LSA (sometimes referred to as a "GRES LSA") from the restarting router). That is, when hub router 102 performs a graceful restart, hub router 102 sends grace LSAs to spoke routers 104, causing spoke routers 104 to act as helper routers for hub router 102 during the graceful restart.

Conventionally, with demand circuits or for topologies where flood reduction is configured, even though there is no topology change, a helper router would also have to re-learn many LSAs from the network, since the sequence number associated with LSAs can be different across different routers for DNA LSAs. The helper routers during a database description (DBD) exchange phase with the restarting router after restart detects these changes and requests the LSAs again, under the assumption that these LSAs are newer (as per the section 13.1 of Moy, "OSPF Version 2," Network Working Group, RFC 2328, April 1998, available at tools.ietf.org/html/rfc2328). But in a stable topology where GRES succeeds, all these LSAs would have the same content, such that only the sequence number changes. This disclosure recognizes, therefore, that such a helper router need not retrieve newer LSAs in these situations. Techniques by which a helper router connected to a gracefully restarting router by a demand circuit (such as spoke router 104A connected to hub router 102 by OSPF demand circuit 108) can determine whether an LSA needs to be refreshed or not are described in greater detail below.

Graceful restart works on the principle that when the restarting router completely learns the database and is full with all neighbors, it exits graceful restart and flushes the grace LSA, which is an indicator for helper nodes to exit graceful restart as well and re-originate their router LSAs. But in demand circuit case, helpers also learn the LSAs from the restarting router, since their sequence numbers do not match. Thus, absent the techniques of this disclosure, spoke router 104A would re-originate its LSAs, because the sequence number for the LSA corresponding to hub router 102 is not synchronized with sequence numbers for the LSA corresponding to hub router 102 as stored by spoke routers 104B-104N. When the restarting router goes to full state, the helper neighbors can be in loading state, which would otherwise cause the graceful restart procedure to fail.

Ideally if there is no restart happening on the topology, these LSAs would not be learned by other routers or get transmitted over the network. This may otherwise cause two issues. First, there would be unnecessary traffic during the graceful restart on any router in hub-and-spoke arrangement 100 (including between hub router 102 and spoke router 104A). This is costly, as the main reason for OSPF demand circuit 108 and other flood reduction topologies is to reduce unnecessary traffic. As another issue, there would be possible route flaps (i.e., alternate advertisements of routes to a destination in a relatively short span of time) during graceful restart across routers in the topology, even though the aim of the protocol for graceful restart is to avoid such route flaps.

Route flaps may otherwise (i.e., outside of the techniques of this disclosure) occur because, per RFC 3623, as soon as the restarting router restores its pre-restart adjacencies (that is, the router goes to a full adjacency state with all of its neighbors), it flushes the grace LSA that it sent during the initial phase of graceful restart. Once the flush information reaches the helper routers, the helper routers exit the helper functionality. As per the standard, all the helpers are to re-originate their router LSAs, depending on the current state of the router once the flush information reaches the helpers. There is a high possibility that the helper router is in a loading state, since it is re-acquiring the non-self-generated LSAs from other routers (due to the sequence number mismatch in the LSAs). This causes the helper router to re-originate its router LSA without the link between helper and the restarting router, as per the section 12.4.1 of RFC 2328. As soon as these LSAs get flooded in the network, there may be route flaps for the routes learned from these routers (without use of the techniques of this disclosure). After a while, the network re-converges back to the same state as before the graceful-restart.

Thus, even though demand circuits and flood reduction deployments are meant to reduce OSPF traffic, an OSPF restart on any router can cause route flaps, which is not expected when OSPF graceful restart is configured.

The issues discussed above may be particularly prominent in a hub-and-spoke arrangement, without the use of the techniques of this disclosure, particularly when the hub undergoes graceful restart. Initially, when different spokes comes up, each of the routers floods its LSAs with the DNA bit set. Thereafter, the LSAs are not flooded (in stable cases). But routers which originated these LSAs keep on refreshing their self-generated LSAs while keeping the LSAs in their respective databases. After the restart at the hub device, the hub exchanges OSPF packets with all the spoke devices and learns the latest LSAs. During this process (again, absent the techniques of this disclosure), each spoke device detects changes to its LSA version and requests the latest LSAs. This may immediately result in the issues mentioned above. Moreover, networks using OSPF are growing larger and will continue to expand to accommodate the demand for connections to the Internet or intranets. The scalable features like demand circuits and flood reduction are often incorporated for better scale and performance. Thus, the impact of the problems is high.

However, in accordance with the techniques of this disclosure, the issues noted above may be avoided. In particular, according to the techniques of this disclosure, spoke router 104A determines whether an LSA for hub router 102 following a graceful restart of hub router 102 needs to be updated within a database of spoke router 104A, even when a sequence number for the LSA from hub router 102 does not match a sequence number for that LSA as stored in the database of spoke router 104A.

Normal behavior for the routers of hub-and-spoke arrangement 100 may be defined as follows: when a router accepts a received database description (DBD) packet during an exchange phase, for each LSA listed, the LSA's type field is checked for validity. If the LSA is valid, the router uses the techniques of section 13.1 of RFC2328, which is a mechanism used in OSPF to determine which LSA is newer (i.e., whether the LSA in the router's database is newer than an LSA of a received DBD packet). If the LSA listed in the received DBD packet is newer than the LSA in the router's database, then the router inserts the LSA in a link state request list so that the LSA can be requested using link state request packets.

The routers of hub-and-spoke arrangement 100 may continue to use this "normal behavior" under certain circumstances, but avoid requesting LSAs in other circumstances. For example, when a router is not in restart helper mode (for a gracefully restarting neighbor router), the router performs the normal behavior. However, if the router is in helper mode with a gracefully restarting neighbor, the router performs the steps discussed below, in accordance with the techniques of this disclosure. These steps are performed to determine which LSA is newer while evaluating the LSA's part of the received DBD packets from a neighbor.

Routers 102, 104 identify an LSA by the LSA's link state type, link state identifier (ID), and an advertising router (i.e., the router that advertised the LSA). For two instances of the same LSA, a router uses the link state sequence number, link state age, and link state checksum fields to determine which instance is more recent, as discussed below:

If the router is in not helper mode with the neighbor from which the DBD is received, fall back to the normal LSA comparison mentioned in section 13.1 of RFC 2328 and proceed accordingly.
 If the LSA does not have the DNA bit set, fall back to the normal LSA comparison listed in the standard and proceed accordingly.
 If the LSA listed has the same sequence number or lesser sequence number than the one stored locally in the router's OSPF database, fall back to the normal LSA comparison listed in the standard and proceed accordingly.
 Find the local LSA that corresponds to the listed LSA and re-compute the link state (LS) checksum after replacing the sequence number with the incoming LS header higher sequence number.
 If the re-computed LS checksum is not equal to the one listed in the DBD packet, then declare the local copy to be old and the one in the received DBD packet is determined to be newer. Then the LSA is put on the Link State request list so that it can be requested in Link State Request Packets. This ensures any change in the content of LSA is detected and synchronized.

If the re-computed LS checksum matches the checksum listed in the DBD, then the LS age field of the listed LSA is checked to see whether it is MaxAge after masking off the DoNotAge bit. If the LS age field is MaxAge, then declare the local copy as old and the one received is newer.

Else the two instances are considered to be identical, and the router does not re-acquire the LSA.

Accordingly, spoke router 104A may be in helper mode during a graceful restart by hub router 102, e.g., after receiving a grace LSA from hub router 102. Prior to performing the graceful restart, hub router 102 sends LSAs to spoke routers 104B-104N within the LSA refresh interval. For each of these LSAs, hub router 102 increments a link state sequence number. However, because hub router 102 and spoke router 104A are coupled by OSPF demand circuit 108, hub router 102 does not send the LSAs to spoke router 104A. Thus, after hub router 102 gracefully restarts, hub router 102 will send an LSA to spoke router 104A that has a sequence number that is not equal to the sequence number of the LSA as stored by spoke router 104A (but is equal to the sequence numbers stored by spoke routers 104B-104N).

Assuming that spoke router 104A is in helper mode with respect to hub router 102, when spoke router 104A receives a databased description (DBD) packet from hub router 102 for which a DNA bit is set, and where the sequence number for the LSA corresponding to the DBD is higher than a sequence number for a corresponding LSA (i.e., an LSA having the same link state ID, link state type, and from hub router 102) as stored in a link state database of spoke router 104, spoke router 104A determines whether the two LSAs are the same by replacing the local LSA's sequence number with the received sequence number and recalculating a checksum, and if the checksum is verified. If the checksum is verified and the link state age for the locally stored LSA does not exceed a max age value, then spoke router 104A avoids requesting the LSA from hub router 102, because spoke router 104A has determined that the locally stored LSA is the same as the LSA for hub router 102, despite the sequence numbers not matching.

Using these techniques, a router may ensure that only legitimately changed LSAs will be requested during the time it helps a gracefully restarting neighbor. Such requested LSAs will be zero if there is no topology change during the grace period. The LS checksum field of the LSA considers all fields except the LS age field. The LS age field for DoNotAge LSA is relevant only if it is MaxAge. During the normal refresh, the sequence number is incremented only if there is no-change in the topology. So by re-computing a local link state checksum with the in-coming higher sequence number in place of our sequence number confirms whether there is any actual change in the local LSA content. This special treatment for DNA LSAs makes it equal to the normal LSA comparison mentioned in the RFC. As soon as the helper mode is existed, the normal comparison of LSAs is used.

By performing these techniques, the routers of hub-and-spoke arrangement 100 may avoid the issues discussed above. In the ideal situation, only the restarting routers will re-learn the LSAs from the network, and the helper neighbors continue with their state of LSAs as if nothing had happened in the network (i.e., as if there had been no graceful restart). So the helper routers transition from exchange state to full state while the restarting router re-learns the topology. Hence, there is no unnecessary OSPF traffic in the network. Also, when the flush grace LSA reaches the helpers, the neighbor's OSPF state will be FULL, and hence, no changed router LSAs are flooded back to the network, therefore no route flaps will occur.

Any change in topology detected during graceful restart at either end results in exiting graceful restart, and hence, the techniques of this disclosure may be fully compatible with the existing graceful restart OSPF standards. In stable topologies, these techniques may completely fulfill the graceful restart functionality. These techniques may result in one or more advantages. For example, these techniques may prevent unnecessary OSPF traffic in the network. These techniques may also prevent disruption of operation of elements in the forwarding plane during graceful restart across the network. These techniques are also interoperable with existing features in OSPF. Moreover, no protocol message changes are needed to implement these techniques, and the techniques are backwards compatible with existing OSPF implementations.

Figure 2:
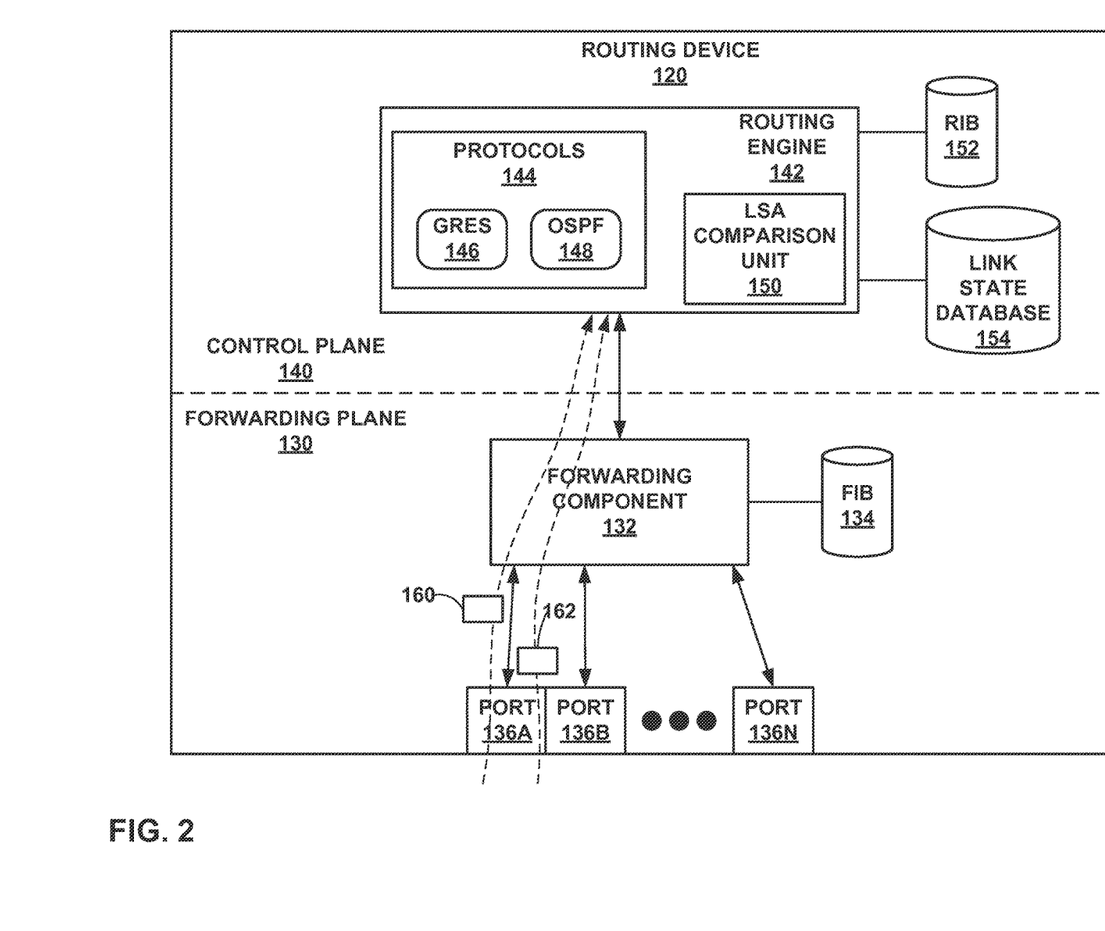
FIG. 2 is a block diagram illustrating an example routing device that performs the techniques of this disclosure.

FIG. 2 is a block diagram illustrating an example routing device 120 that performs the techniques of this disclosure. Routing device 120 may, for example, represent one of routers 102, 104 of FIG. 1. In the example of FIG. 2, routing device 120 is conceptually partitioned into distinct, functional "planes," forwarding plane 130 and control plane 140. Although not shown in FIG. 2, routing device 120 may also include additional planes, such as a service plane. In the example of FIG. 2, forwarding plane 130 includes forwarding component 132, which receives and sends packets external to routing device 120 via ports 136A-136N (ports 136). Forwarding component 132 also sends and receives data to/from routing engine 142, such as link state advertisements (LSAs) and database description (DBD) packets. Forwarding component 132 generally forwards data according to forwarding information base (FIB) 134.

In this example, control plane 140 includes routing engine 142, routing information base 152, and link state database 154. Routing engine 142 receives LSAs via forwarding component 132 from other routers in the network. Thus, routing engine 142 executes protocols 144, which include various routing protocols, to determine routes through a network. Protocols 144 may generally include link-state routing protocols and/or distance-vector routing protocols. For purposes of explanation, protocols 144 include open shortest path first (OSPF) 148. Furthermore, protocols 144 may include other protocols related to routing, such as graceful restart (GRES) 146, as shown in the example of FIG. 2.

Routing engine 142 executes OSPF 148 to calculate routes through a network, such as an autonomous system, including a plurality of routers. For example, such a network may correspond to (or include) hub-and-spoke arrangement 100 of FIG. 1. Thus, routing engine 142 receives LSAs for other routers in the autonomous system and stores the LSAs in link state database 154. In general, link state database 154 stores LSAs, sequence numbers associated with the LSAs, and data indicating whether the LSA is to be aged (e.g., based on whether the LSA was received with a DoNotAge bit set).

In accordance with link state database 154, routing engine 142 programs FIB 134 that associates network destinations or other keying information with specific next hops and corresponding interface ports 136 of routing device 120. Routing engine 142 typically processes link state database 154 to perform route selection and generate FIB 134 based on selected routes. In this way, forwarding information may be programmed into forwarding plane 130. Control plane 140 may generate FIB 134 in the form of a table, list, radix tree or other data structure.

When forwarding a packet, forwarding component 132 traverses FIB 134 based on keying information within a header of the packet to ultimately select a next hop and one of ports 136 to which to forward the packet. Based on the selection, forwarding component 132 output the packet to the appropriate one of ports 136. The techniques discussed herein are not limited to the example architecture of FIG. 2. In other examples, routing device 120 may be configured in a variety of ways. In one example, all or portions of control plane 140 and forwarding plane 130 may be replicated and incorporated directly within interface cards (not shown) including ports similar to ports 136.

Furthermore, routing engine 142 may be configured to establish a demand circuit via one of ports 136 with another router in the autonomous system. When a demand circuit is established with another router, routing engine 142 may be configured to determine that LSAs for which a DoNotAge bit is set will not be refreshed, that is, that routing device 120 will not receive periodic LSA refreshes in the same way as if routing device 120 were communicatively coupled to the other router without the demand circuit. LSA 160 represents an example of an LSA received from another router to which routing device 120 is communicatively coupled via a demand circuit (e.g., a hub router, such as hub router 102 of FIG. 1).

In the example of FIG. 2, it is assumed that routing device 120 acts as a helper router to another router that is performing a graceful restart, e.g., in response to receiving a graceful restart LSA, also referred to herein as a grace LSA. For example, routing device 120 may correspond to spoke router 104A of FIG. 1 (although it should be understood that hub router 102 and the other spoke routers 104 may include components similar to those of routing device 120). Accordingly, routing device 120 may be coupled to another router, such as hub router 102, that performs a graceful restart.

In general, routing engine 142 executes OSPF 148 to periodically output (i.e., flood) LSAs of link state database 154 to other routing devices of a network that includes routing device 120. For example, if routing engine 142 receives a new or updated LSA, routing engine 142 floods these LSAs to other routers of the same autonomous system (except when interfaces are configured for a demand circuit or other flood reduction techniques). In response to receiving a graceful restart LSA, routing device 120 continues to advertise LSAs associated with the gracefully restarting router as if the gracefully restarting router were still fully operational. In other words, routing device 120 continues to indicate an adjacency to the gracefully restarting router to other routers in the same autonomous system.

Following such a graceful restart, routing device 120 receives a database description (DBD) packet from the restarted router (e.g., DBD packet 162). In general, DBD packet 162 includes information indicative of LSAs of the gracefully restarted router, including sequence numbers associated with those LSAs. It is assumed, for purposes of explanation, that although routing device 120 and the gracefully restarted router are communicatively coupled via a demand circuit, the gracefully restarted router is also communicatively coupled to one or more other routers without the use of demand circuits. Accordingly, the gracefully restarted router periodically refreshes the LSAs, which results in sequence numbers associated with those LSAs being incremented.

In accordance with the example of FIG. 2, representing one example of the techniques of this disclosure, routing engine 142 includes LSA comparison unit 150. LSA comparison unit 150 is configured to determine, for LSAs received from gracefully restarted routers to which routing device 120 is communicatively coupled via a demand circuit, whether the LSAs are different than corresponding LSAs stored in link state database 154 despite differences in sequence numbers between the LSAs. Although an LSA's sequence number may have been incremented after having originally had a DoNotAge bit set in the LSA, this does not necessarily mean that the LSA has changed. In recognition of this, LSA comparison unit 150 determines whether such an LSA has in fact changed.

Figure 3:
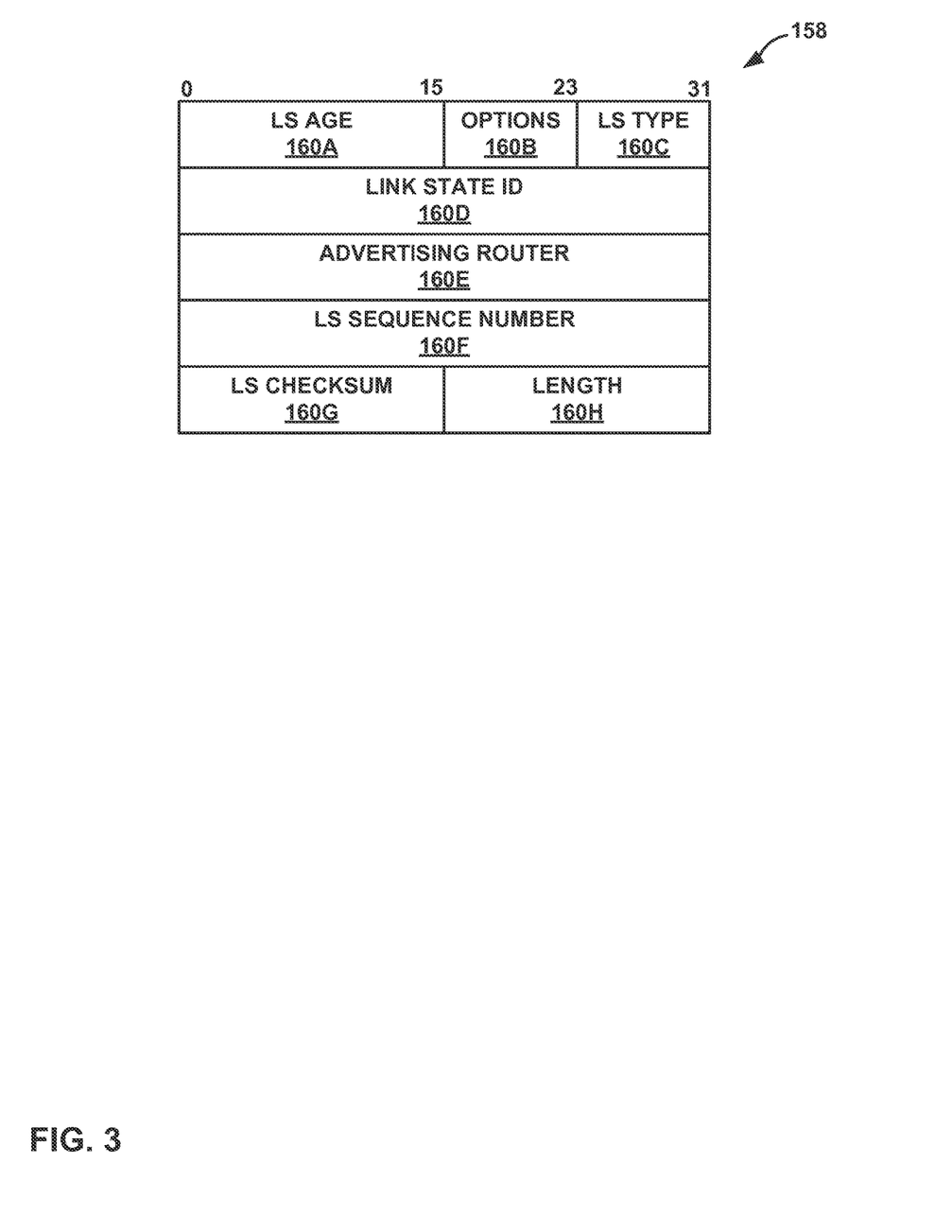
FIG. 3 is an example of a link state advertisement (LSA) message header.

In one example, to determine whether an LSA has changed, LSA comparison unit receives a new sequence number for the LSA and a new checksum for the LSA. FIG. 3, described in greater detail below, illustrates an example of an LSA, including fields for the checksum and the sequence number. In one example, to determine whether the LSA having the DNA bit set while routing device 120 is operating in GRES helper mode has changed, LSA comparison unit 150 replaces a current sequence number for a version of the LSA as stored in link state database 154 with the new sequence number (such as the sequence number received in, e.g., DBD packet 162). LSA comparison unit 150 then recalculates a checksum for the LSA based on the new sequence number. If the recalculated checksum matches the newly received checksum, LSA comparison unit 150 determines that the LSA has not changed. In the case that LSA comparison unit 150 determines that the LSA has not changed, routing engine 142 (executing GRES 146) determines to avoid sending a request for a current link state to, e.g., hub router 102. On the other hand, if LSA comparison unit 150 determines that the LSA has changed, routing engine 142 requests a current link state from hub router 102. Alternatively, if the age of the LSA exceeds maxAge, that is, a predetermined maximum age, routing engine 142 may also determine that the LSA is newer, and therefore, request the current link state. The checksum includes all fields of an LSA, except for the LS age field.

Either or both of routing engine 142 and forwarding component 132 may be implemented in hardware or a combination of hardware and software and/or firmware. When implemented in software and/or firmware, it should be understood that requisite hardware (such as memory to store instructions and one or more hardware-based processors to execute the instructions) are also provided. Examples of hardware-based processors include, for example, microprocessors, ASICs, DSPs, FPGAs, and the like.

Accordingly, routing device 120 represents an example of a routing device of a network that includes a network interface (e.g., one of ports 136) communicatively coupled to a remote routing device (e.g., hub router 102 of FIG. 1) via a demand circuit. Routing device 120 also represents an example of a routing including one or more hardware-based processors (e.g., routing engine 142 and forwarding component 132) configured to receive a first set of data from the remote routing device indicating a first link state for the remote routing device according to a link-state protocol (such as LSA 160), where the first set of data is associated with a first sequence number. Similarly, the hardware-based processors store data representative of the first link state and the first sequence number (e.g., in link state database 154).

After receiving the first set of data, routing engine 142 may receive a second set of data (e.g., a graceful restart LSA) from the remote routing device that indicates that the remote routing device will be performing a graceful restart, as discussed above. After receiving this second set of data, routing engine 142 may receive a third set of data from the remote routing device representative of a second link state for the remote routing device (e.g., DBD packet 162), where the third set of data is associated with a second sequence number that is different than the first sequence number.

In this example, in response to the second set of data and the third set of data, LSA comparison unit 150 may determine whether the second link state is different than the first link state despite the difference between the first sequence number and the second sequence number. As discussed above, LSA comparison unit 150 may replace the first sequence number with the second sequence number, recalculate a checksum for the LSA stored in link state database 154, and compare the recalculated checksum to a newly received checksum for the LSA, and if there is a match, determine that the LSAs are the same, aside from the sequence numbers. When the second link state is determined to be the same as the first link state despite the difference between the first sequence number and the second sequence number, routing engine 142 (in this example) avoids sending a request for a current link state to the remote routing device.

FIG. 3 is an example of a link state message header 158. Link state message header 200, as shown in the exemplary embodiment of FIG. 3, complies with the OSPF protocol. That is, link state message header 158 comprises a set of four-byte rows, as reflected in FIG. 3 by the 0-31 bit range for each row shown at the top of header 158. Further details of the format of OSPF link state messages can be found in RFC 2328, Internet Engineering Task Force (IETF), April, 1998.

As shown in FIG. 3, link state message header 158 includes a link state (LS) message age field 160A, options field 160B, LS type field 160C, link state identifier field 160D ("link state ID 160D"), advertising router field 160E, link state sequence number field 160F, link state checksum field 160G, and length field 160H. Although shown as contain fields 160A-60H ("fields 160"), link state message header 158 may contain more or less fields 160 than those shown in FIG. 3.

LS age field 160A typically specifies the age of the link state message bearing link state message header 158 in seconds and may be used to distinguish between two link state messages specifying the same link state message sequence number in their respective LS sequence number field 160F. One bit of LS age field 160A (e.g., a most significant bit or a high bit) corresponds to a DoNotAge bit. According to RFC 1793, when the DoNotAge bit is set, the LSA is not aged as it is held in a link state database, such as link state database 154 (FIG. 2). This allows for elimination of periodic LSA refresh over demand circuits.

Options field 160B may specify which optional capabilities are associated with the link state message bearing link state message header 158. LS type field 160C indicates the format and function of the link state message bearing link state message header 158, i.e., the type of link state message. If LS type field 160C stores a "1," for example, the link state message associated with link state message header 158 is designated as a router link state message. Alternatively, if LS type field 160C stores a "2," the link state message defined by link state message header 158 is determined to be a network link state message.

Link state ID field 160D typically identifies a portion of the routing domain that is being described by the link state message bearing link state message header 158. Advertising router field 160E may specify the OSPF router identifiers of the link state message's originator. LS sequence number field 160F may comprise a signed 32-bit integer used to detect old and duplicate link state messages. LS checksum field 160G may indicate whether the link state message accompanying link state message header 158 contains errors, and OSPF modules 44 may employ LS checksum field 160G to discard possibly faulty link state messages. Length field 160H indicates the length of link state message 158.

In accordance with the techniques of this disclosure, two LSAs may be determined to be the same when the LSAs differ only by sequence numbers indicated by, e.g., LS sequence number field 160F during graceful restart for LSAs having the DNA bit set. In one example, to determine whether two LSAs (a stored LSA with a first sequence number and a new LSA with a second, different sequence number) are in fact different, the first sequence number may be replaced by the second sequence number, and then the checksum may be recalculated. In some examples, LSA comparison unit 150 (FIG. 2) performs this comparison. When the recalculated checksum for the modified stored LSA matches the checksum for the new LSA, LSA comparison unit 150 determines that the two LSAs are in fact the same, despite the differences in sequence numbers. In accordance with RFC 2328, the checksum does not include LS age field 160A.

Figure 4:
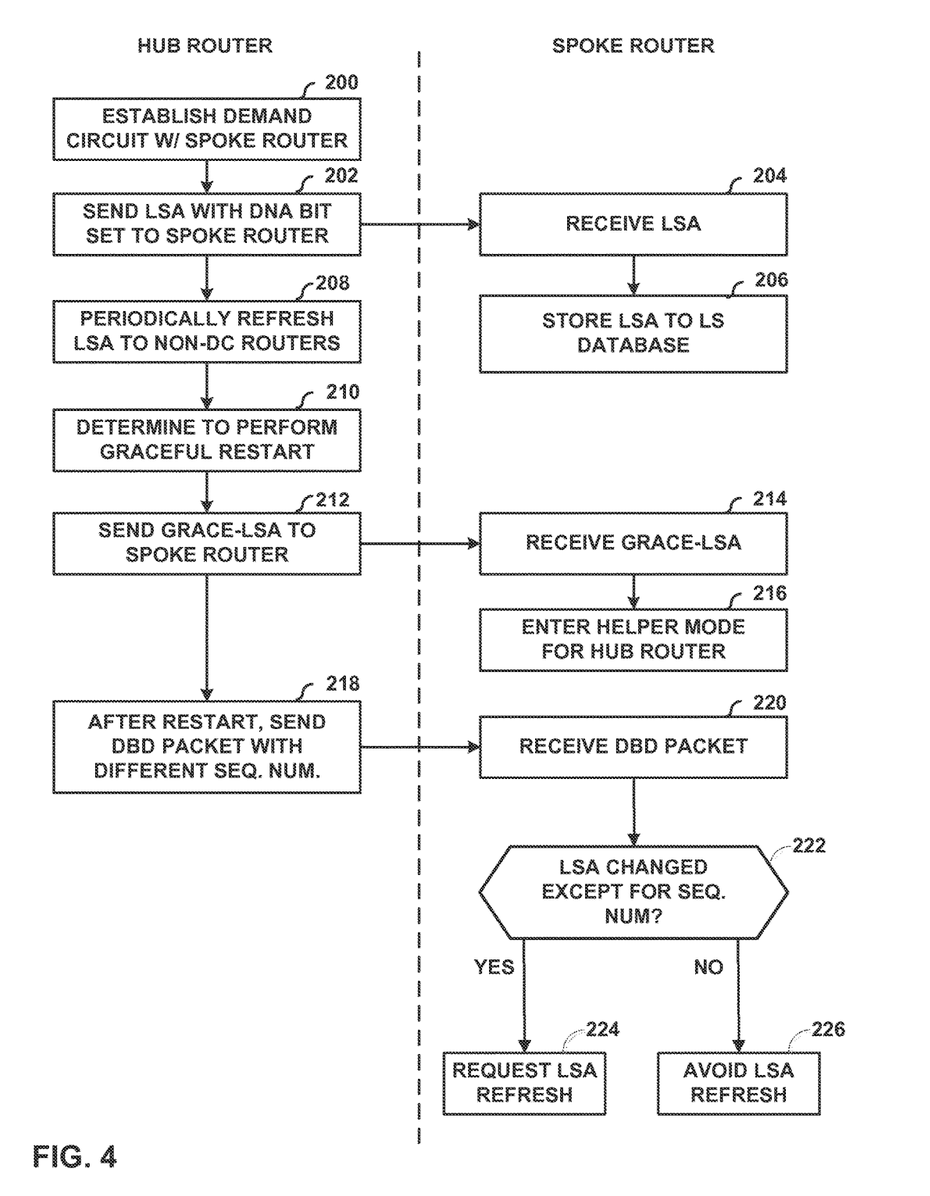
FIG. 4 is a flowchart illustrating an example method for determining whether to request an LSA refresh in accordance with the techniques of this disclosure.

FIG. 4 is a flowchart illustrating an example method for determining whether to request an LSA refresh in accordance with the techniques of this disclosure. The method of FIG. 4 is explained with respect to a hub router (e.g., hub router 102 of FIG. 1) and a spoke router (e.g., spoke router 104A of FIG. 1). However, it should be understood that other devices may be configured to perform the method of FIG. 4. For instance, generally any two routers that exchange routing information using a link-state protocol (and that are configured to use flood reduction techniques, such as demand circuits) may be configured to perform the techniques of this disclosure during graceful restart.

In the example of FIG. 4, hub router 102 initially establishes a demand circuit with spoke router 104A (200). Further, hub router 102 forms and sends an LSA with a DoNotAge (DNA) bit set to spoke router 104A. The DNA bit indicates that the LSA is not to be aged. The LSA includes a sequence number, e.g., in an LS sequence number field 160F. Spoke router 104A receives the LSA (204) and stores the LSA to its link state database (e.g., link state database 154 of FIG. 2). In other words, in step 204, spoke router 104A receives a first set of data from hub router 102 indicating a first link state for hub router 102 according to a link-state protocol (e.g., OSPF), wherein the first set of data is associated with a first sequence number, and stores data representative of the first link state and the first sequence number.

Because of the demand circuit in this example, hub router 102 does not send LSA refreshes to spoke router 104A, and likewise, spoke router 104A is configured to not receive such LSA refreshes. However, it is assumed that hub router 102 is also communicatively coupled to one or more other routers without the use of a demand circuit (e.g., other spoke routers 104 of FIG. 1). Hub router 102 periodically refreshes the LSA to routers to which hub router 102 is coupled via non-demand circuit (DC) connections (208). Thus, with each LSA refresh, hub router 102 increments the sequence number for the LSA. Accordingly, these other routers and hub router 102 will associate the LSA with a different sequence number than spoke router 104A.

Subsequently, hub router 102 may determine to perform a graceful restart (210). In response to this determination, hub router 102 sends a grace-LSA to spoke router 104A (212). Spoke router 104A receives the grace-LSA (214) and enters helper mode for hub router 102 (216), e.g., according to RFC 3623. In other words, after receiving the first set of data discussed above (e.g., the LSA with the DNA bit set), spoke router 104A receives a second set of data from hub router 102 indicating that hub router 102 will be performing a graceful restart.

After the restart, hub router 102 sends a database description (DBD) packet with a different sequence number for the LSA to spoke router 104A (218). In other words, after receiving the second set of data (e.g., the grace-LSA), spoke router 104A receives a third set of data from hub router 102 representative of a second link state for hub router 102, wherein the third set of data is associated with a second sequence number that is different than the first sequence number.

Spoke router 104A receives the DBD packet (220) and determines whether the LSA has changed, despite the change to the sequence number (222). Furthermore, spoke router 104A may disregard any differences between link state ages for the LSAs when determining whether the LSA has changed. In one example, to determine whether the LSA has changed, spoke router 104A replaces the stored sequence number with the new sequence number indicated by the DBD packet and recalculates a checksum for the LSA, then compares the recalculated checksum to a checksum indicated by the DBD packet for the LSA, and determines that the LSA is different only when the recalculated checksum does not match the checksum indicated by the DBD packet. In accordance with RFC 2328, the checksum does not include the link state age field (e.g., LS age field 160A of FIG. 3).

In the case that the LSA has not changed ("NO" branch of 222), spoke router 104A avoids sending a request for a current link state to hub router 102 after verifying that the LSA age is not maxAge. In other words, spoke router 104A avoids sending a request for a current link state to hub router 102 when the second link state is determined to be the same as the first link state despite the difference between the first sequence number and the second sequence number. However, when the LSA has changed ("YES" branch of 222), spoke router 104A requests an LSA refresh from, e.g., hub router 102. By avoiding sending such requests for LSA refreshes when the LSA has not actually changed (other than, e.g., the sequence number), the method of FIG. 4 may prevent unnecessary LSA refreshes, which may reduce link state protocol traffic and any unnecessary route flaps.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   receiving, by a first routing device that is communicatively coupled to a second routing device via a link on which a flood reduction technique is used, a first set of data from the second routing device indicative of a first link state for the second routing device according to a link-state protocol, wherein the first set of data is associated with a first sequence number and with a first checksum;
   storing, by the first routing device, data representative of the first link state and the first sequence number;
   after receiving the first set of data, receiving, by the first routing device, a second set of data from the second routing device indicating that the second routing device will be performing a graceful restart;
   after receiving the second set of data, receiving, by the first routing device, a third set of data from the second routing device representative of a second link state for the second routing device, wherein the third set of data is associated with a second sequence number that is different than the first sequence number, and wherein the third set of data is associated with a second checksum;
   in response to the second set of data and the third set of data, determining, by the first routing device, whether the second link state is the same as the first link state despite the difference between the first sequence number and the second sequence number, wherein determining whether the second link state is the same as the first link state comprises calculating a third checksum using the stored first link state after replacing the first sequence number with the second sequence number; and avoiding, by the first routing device, sending a request for a current link state to the second routing device when the second link state is determined to be the same as the first link state despite the difference between the first sequence number and the second sequence number, wherein avoiding sending the request comprises avoiding sending the request when the third checksum is the same as the second checksum.

2. The method of claim 1, wherein the first routing device and the second routing device are members of a common autonomous system.

3. The method of claim 1, wherein the first set of data comprises a link state advertisement (LSA).

4. The method of claim 1, wherein the second set of data comprises a grace link state advertisement (LSA).

5. The method of claim 1, wherein the third set of data comprises a database description (DBD) packet.

6. The method of claim 1, further comprising requesting data indicative of the current link state from the second routing device when the second link state is different than the first link state.

7. The method of claim 1, further comprising requesting data indicative of the current link state from the second routing device when an age of the stored data representing the first link state is equal to or greater than a predetermined maximum age.

8. The method of claim 1, wherein the first routing device comprises a spoke router, and wherein the second routing device comprises a hub router.

9. The method of claim 1, wherein the link-state protocol comprises Open Shortest Path First (OSPF).

10. The method of claim 1, wherein the link on which the flood reduction technique is used comprises an OSPF demand circuit.

11. A routing device comprising:
a network interface communicatively coupled to a remote routing device of via a link on which a flood reduction technique is used; and
one or more hardware-based processors configured to:
receive, via the network interface, a first set of data from the remote routing device indicative of a first link state for the remote routing device according to a link-state protocol, wherein the first set of data is associated with a first sequence number and with a first checksum,
store data representative of the first link state and the first sequence number,
after receiving the first set of data, receive, via the network interface, a second set of data from the remote routing device indicating that the remote routing device will be performing a graceful restart,
after receiving the second set of data, receive, via the network interface, a third set of data from the remote routing device representative of a second link state for the remote routing device, wherein the third set of data is associated with a second sequence number that is different than the first sequence number, and wherein the third set of data is associated with a second checksum,
in response to the second set of data and the third set of data, determine whether the second link state is different than the first link state despite the difference between the first sequence number and the second sequence number, wherein to determine whether the second link state is the same as the first link state, the one or more hardware-based processors are further configured to calculate a third checksum using the stored first link state after replacing the first sequence number with the second sequence number, and
avoid sending a request for a current link state to the remote routing device when the second link state is determined to be the same as the first link state despite the difference between the first sequence number and the second sequence number, wherein the one or more processors are configured to avoid sending the request when the third checksum is the same as the second checksum.

12. The routing device of claim 11, wherein the first routing device and the second routing device are members of a common autonomous system.

13. The routing device of claim 11, wherein the first set of data comprises a link state advertisement (LSA).

14. The routing device of claim 11, wherein the second set of data comprises a grace link state advertisement (LSA).

15. The routing device of claim 11, wherein the third set of data comprises a database description (DBD) packet.

16. The routing device of claim 11, wherein the one or more processors are further configured to request data indicative of the current link state from the remote routing device when the second link state is different than the first link state.

17. The routing device of claim 11, wherein the one or more processors are further configured to request data indicative of the current link state from the remote routing device when an age of the stored data representing the first link state is equal to or greater than a predetermined maximum age.

18. The routing device of claim 11, wherein the routing device comprises a spoke router, and wherein the remote routing device comprises a hub router.

19. The routing device of claim 11, wherein the link-state protocol comprises Open Shortest Path First (OSPF).

20. The routing device of claim 11, wherein the link on which the flood reduction technique is used comprises an OSPF demand circuit.

21. A system comprising:
a first routing device; and
a second routing device communicatively coupled to the first routing device via a link on which a flood reduction technique is used,
wherein the second routing device is configured to send a first set of data to the first routing device indicative of a first link state for the second routing device according to a link-state protocol, wherein the first set of data is associated with a first sequence number and with a first checksum, send a second set of data to the first routing device indicating that the second routing device will be performing a graceful restart, and after performing the graceful restart, to send a third set of data to the first routing device representative of a second link state for the second routing device following the graceful restart, wherein the third set of data is associated with a second sequence number that is different than the first sequence number, and wherein the third set of data is associated with a second checksum, and
wherein the first routing device is configured to store the first set of data and, in response to receiving the second set of data and the third set of data, determine whether the second link state is different than the first link state despite the difference between the first sequence number and the second sequence number, wherein to determine whether the second link state is different than the first link state, the first routing device is configured to calculate a third checksum using the stored first link state after replacing the first sequence number with the second sequence number, and wherein the first routing device is configured to avoid sending a request for a current link state to the second routing device when the second link state is determined to be the same as the first link state despite the difference between the first sequence number and the second sequence number, wherein the first routing device is configured to avoid sending the request for the current link state when the third checksum is the same as the second checksum.

22. The system of claim 21, wherein the system comprises an autonomous system.

23. The system of claim 21, wherein the first set of data comprises a link state advertisement (LSA), wherein the second set of data comprises a grace LSA, and wherein the third set of data comprises a database description (DBD) packet.

24. The system of claim 21, wherein the first routing device is further configured to request data indicative of the current link state from the second routing device when the second link state is different than the first link state.

25. The system of claim 21, wherein the first routing device comprises a spoke router, and wherein the second routing device comprises a hub router.

26. The system of claim 21, wherein the link-state protocol comprises Open Shortest Path First (OSPF), and wherein the link on which the flood reduction technique is used comprises an OSPF demand circuit.

27. The system of claim 21, further comprising a third routing device communicatively coupled to the second routing device via a connection despite a demand circuit, wherein the second routing device is configured to send, prior to the second set of data, one or more sets of data representative of respective link states of the second routing device to the third routing device without sending the one or more sets of data representative of the link states to the first routing device, based on the demand circuit.

28. A computer-readable storage medium comprising instructions that, when executed, cause a processor of a routing device, communicatively coupled to a remote routing device via a link on which a flood reduction technique is used, to:
receive a first set of data from the remote routing device indicative of a first link state for the remote routing device according to a link-state protocol, wherein the first set of data is associated with a first sequence number and with a first checksum;
store data representative of the first link state and the first sequence number;
after receiving the first set of data, receive a second set of data from the remote routing device indicating that the remote routing device will be performing a graceful restart;
after receiving the second set of data, receive a third set of data from the remote routing device representative of a second link state for the remote routing device, wherein the third set of data is associated with a second sequence number that is different than the first sequence number, and wherein the third set of data is associated with a second checksum;
in response to the second set of data and the third set of data, determine whether the second link state is different than the first link state despite the difference between the first sequence number and the second sequence number, wherein the instructions that cause the processor to determine whether the second link state is the same as the first link state comprise instructions that cause the processor to calculate a third checksum using the stored first link state after replacing the first sequence number with the second sequence number; and
avoid sending a request for a current link state to the remote routing device when the second link state is determined to be the same as the first link state despite the difference between the first sequence number and the second sequence number, wherein the instructions that cause the processor to avoid sending the request for the current link state comprise instructions that cause the processor to avoid sending the request when the third checksum is the same as the second checksum.

29. The computer-readable storage medium of claim 28, wherein the first set of data comprises a link state advertisement (LSA), wherein the second set of data comprises a grace LSA, and wherein the third set of data comprises a database description (DBD) packet.

30. The computer-readable storage medium of claim 28, wherein the one or more processors are further configured to request data indicative of the current link state from the remote routing device when the second link state is different than the first link state.

31. The computer-readable storage medium of claim 28, wherein the routing device comprises a spoke router, and wherein the remote routing device comprises a hub router.

32. The computer-readable storage medium of claim 28, wherein the link-state protocol comprises Open Shortest Path First (OSPF), and wherein the link on which the flood reduction technique is used comprises an OSPF demand circuit.

33. A method comprising:
receiving, by a first routing device that is communicatively coupled to a second routing device via a link on which a flood reduction technique is used, a first set of data from the second routing device indicative of a first link state for the second routing device according to a link-state protocol, wherein the first set of data is associated with a first sequence number;
storing, by the first routing device, data representative of the first link state and the first sequence number;
after receiving the first set of data, receiving, by the first routing device, a second set of data from the second routing device indicating that the second routing device will be performing a graceful restart;
after receiving the second set of data, receiving, by the first routing device, a third set of data from the second routing device representative of a second link state for the second routing device, wherein the third set of data is associated with a second sequence number that is different than the first sequence number;
in response to the second set of data and the third set of data, determining, by the first routing device, whether the second link state is the same as the first link state despite the difference between the first sequence number and the second sequence number, wherein determining whether the second link state is the same as the first link state comprises determining whether the second link state is the same as the first link state despite the difference between the first sequence number and the second sequence number and despite any difference between a first age for the first link state and a second age for the second link state; and avoiding, by the first routing device, sending a request for a current link state to the second routing device when the second link state is determined to be the same as the first link state despite the difference between the first sequence number and the second sequence number.

* * * * *